United States Patent
Cohen

[19]

[11] Patent Number: 5,911,243
[45] Date of Patent: Jun. 15, 1999

[54] MULTIPORT CONVERSION SYSTEM FOR BUTTERFLY VALVE

[75] Inventor: Joseph D. Cohen, Aurora, Colo.

[73] Assignee: Univalve LLC, Aurora, Colo.

[21] Appl. No.: 08/948,545

[22] Filed: Oct. 10, 1997

[51] Int. Cl.⁶ .................................................. F16K 11/02
[52] U.S. Cl. ................................ 137/625.46; 137/625.43
[58] Field of Search .................... 137/625.46, 625.43; 251/367

[56] References Cited

U.S. PATENT DOCUMENTS

| | | |
|---|---|---|
| 4,420,140 | 12/1983 | Gachot ................................. 251/367 X |
| 4,623,001 | 11/1986 | Vogler et al. .................. 137/625.43 X |
| 4,774,977 | 10/1988 | Cohen . | 
| 5,105,853 | 4/1992 | Lie ..................................... 137/625.46 |

OTHER PUBLICATIONS

Asahi/America, Malden, MA, "Thermoplastic Valves and Piping," publ. on or before Oct. 10, 1997.

*Primary Examiner*—John Fox
*Attorney, Agent, or Firm*—Carol W. Burton; Holland & Hart LLP

[57] ABSTRACT

A serviceable multiport conversion system for a conventional butterfly valve includes two fittings. A first "T" fitting contains two passageways which join at an internal common bore adjacent a separating wall, the wall defining a secondary seat of the multiport valve. Circumscribing the common bore is an annular flange. A second fitting may be a similar "T" fitting or an "L" fitting. The "L" fitting contains a single passageway which terminates at an internal bore circumscribed an annular flange. In use, the butterfly valve is removably positioned in sealing engagement between two fittings, with the flanges releasably attached and the inner diameters of the flanges co-extensive with the butterfly valve bore. When a butterfly valve is positioned between an "L" fitting and a "T" fitting and the valve is in its closed position, there is no fluid communication between the passageway of the "L" fitting and the passageways of the "T" fitting. When the valve is in its open position, fluid communication exists between the passageway of the "L" fitting and one of the "T" fitting's passageways. When a butterfly valve is positioned between two "T" fittings and the valve is in a closed position, fluid communication is allowed between passageway pairs of each "T" fitting but not between fittings. When the butterfly valve is in an open position, fluid communication does not exist between passageway pairs of a single fitting, but does exist between one passageway of one fitting fittings and the adjacent passageway of the other fitting.

17 Claims, 18 Drawing Sheets

MULTIPORT CONVERSION SYSTEM FOR BUTTERFLY VALVE

FIELD OF THE INVENTION

The present invention relates to valves providing controlled fluid flow in piping systems. More particularly, the present invention relates to butterfly valves for piping systems.

BACKGROUND OF THE INVENTION

U.S. Pat. No. 4,774,977 for FULL FLOW MULTIPORT BUTTERFLY VALVE (incorporated herein by reference) discloses a multiport valve with union plumbing connections utilizing a disc diverter permanently housed in a spherical two piece welded housing. The multiport disclosed in the '977 patent is described as a nonserviceable but easily replaced multiport valve with low resistance.

A process for manufacturing the multiport valve disclosed in the '977 patent is described therein as starting with the separate molding of top and bottom valve body halves. After molding is complete, the valve body halves are deflashed. The bottom valve body half is then positioned in a vibration welding fixture, the diverter is positioned on the splined shaft located in the bottom fixture, the top body half is positioned thereover and the two valve body halves are welded by vibration welding. The four union port flange faces are then machined to remove welding fixture flanges. O-ring glands are then machined into the faces of the union pipe parts. The inside of the valve is then deflashed at the weld area using an ultrasonic scalpel. Although the scalpel may be automatically indexed to accurately follow the port, ramp and seal areas, removal of the weld flash is necessarily an individually monitored process.

While the manufacturing steps outlined above are relatively straightforward, it is now believed that the tooling required to set up machinery to manufacture individual multiport valves like those described in the '977 patent is relatively expensive. The expense is heightened, in part, by the close tolerances required to manufacture the valve body components and the disc diverter components, which sealingly engage the valve body components.

In any case, the multiport valve described in U.S. Pat. No. 4,774,977 was primarily intended to satisfy a perceived process flow design need for a disposable multiport valve. There remains a need, however, for a serviceable multiport valve. For example, operational requirements may include the ability to disassemble and visually inspect a multiport valve if flow blockage has occurred. Disassembly of a welded multiport valve is typically impractical. Other fluid processing operations may require replacement of disposable valve elements such as O-rings, disc diverters, and elastomeric dynamic seals, rather than allowing for discard and replacement of an entire multiport valve. Unserviceable, disposable, welded multiport valves would not be expected to satisfy the operating requirements of such a plant.

It is therefore an object of the present invention to provide a multiport valve which is economical to manufacture and does not require component welding or deflashing.

It is also an object of the present invention to provide a multiport valve which is serviceable.

It is a further object of the present invention to provide a multiport valve having the aforementioned characteristics, in which fluid leaks through internal leak paths is prevented.

It is against this background that the significant improvements and advancements of the present invention have taken place in the field of butterfly valves.

SUMMARY OF THE INVENTION

In accordance with the aforementioned objects, the present invention includes a multiport valve conversion system in which a conventional butterfly valve is mounted. Each multiport valve conversion system of the present invention includes two fittings, one on either side of the valve. A first "T" fitting contains two passageways which join at an internal common bore adjacent a separating wall, the wall defining a secondary seat of the multiport valve. Circumscribing the common bore is an annular flange. A second fitting may be a similar "T" fitting or an "L" fitting. The "L" fitting contains a single passageway which terminates at an internal bore circumscribed by an annular flange. The "L" fitting also includes a secondary seat. In a preferred embodiment of the present invention, the butterfly valve is removably positioned in sealing engagement between two fittings, with the flanges releasably attached and the inner diameters of the flanges substantially co-extensive with the butterfly valve bore. Internal leaking between the butterfly valve and the two fittings is prevented by a pair of annular gaskets, each of which circumscribe one of the annular flanges of the two fittings, flush with the butterfly valve bores.

When a butterfly valve is positioned between an "L" fitting and a "T" fitting of the present invention, and the valve is in its closed position, there is no fluid communication between the passageway of the "L" fitting and the passageways of the "T" fitting. When the valve is in its open position, fluid communication exists between the passageway of the "L" fitting and one of the "T" fitting's passageways. When a butterfly valve is positioned between two "T" fittings of the present invention and the valve is in a closed position, fluid communication is allowed between passageway pairs of each "T" fitting but not between fittings. When the butterfly valve is in an open position, fluid communication does not exist between passageway pairs of a single fitting, but does exist between one passageway of one fitting and the adjacent passageway of the other fitting.

A more complete appreciation of the present invention and its scope can be obtained from the following description of the drawings, detailed description of presently preferred embodiments of the invention, and the appended claims.

DETAILED DESCRIPTION

Figure 1:
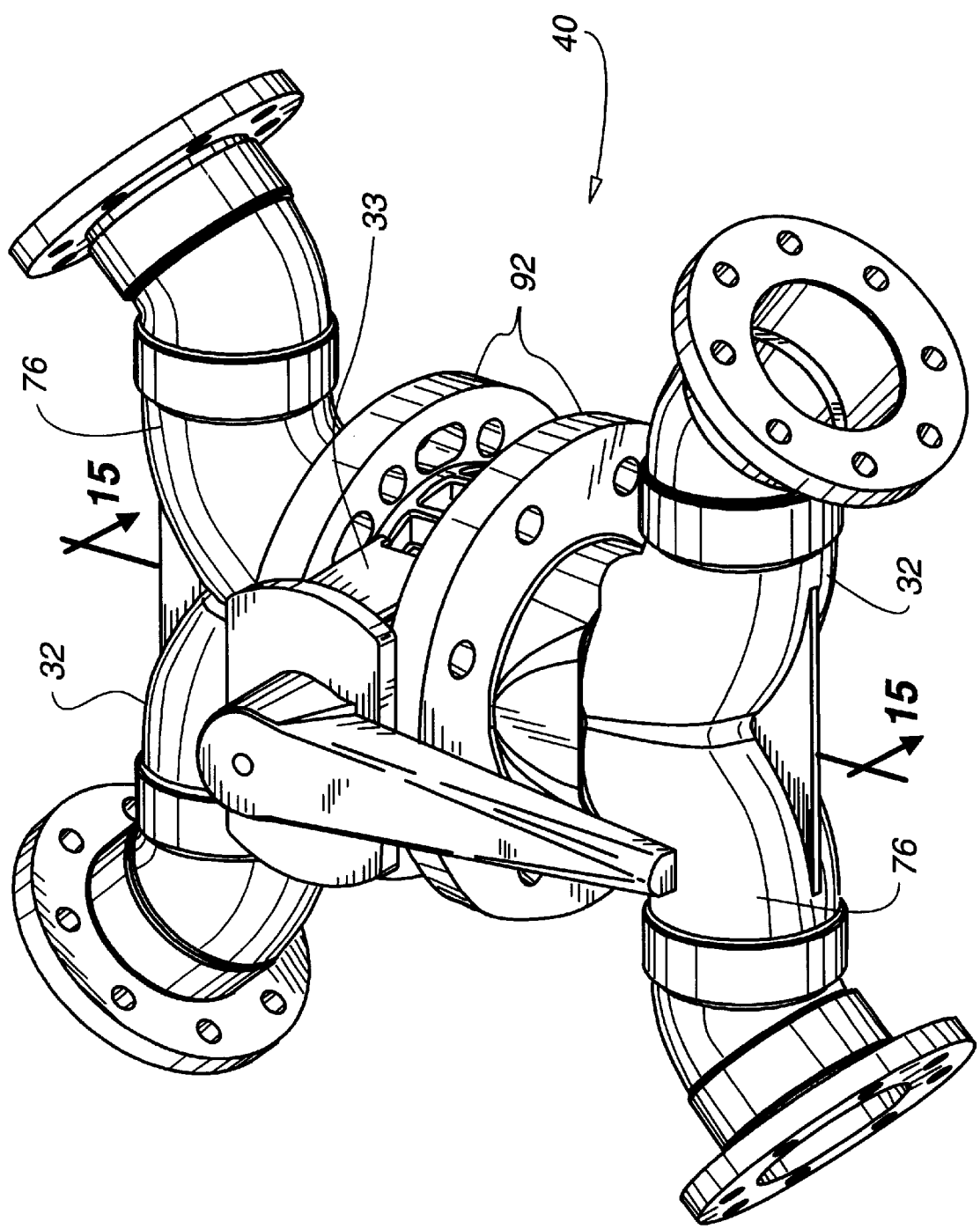
FIG. 1 is a top perspective view of a multiport valve comprising the multiport conversion system of the present invention having two "T" fittings, adapting an "off the shelf" butterfly valve to provide for selective control of fluid flow among four fluid passageways.
Figure 2:
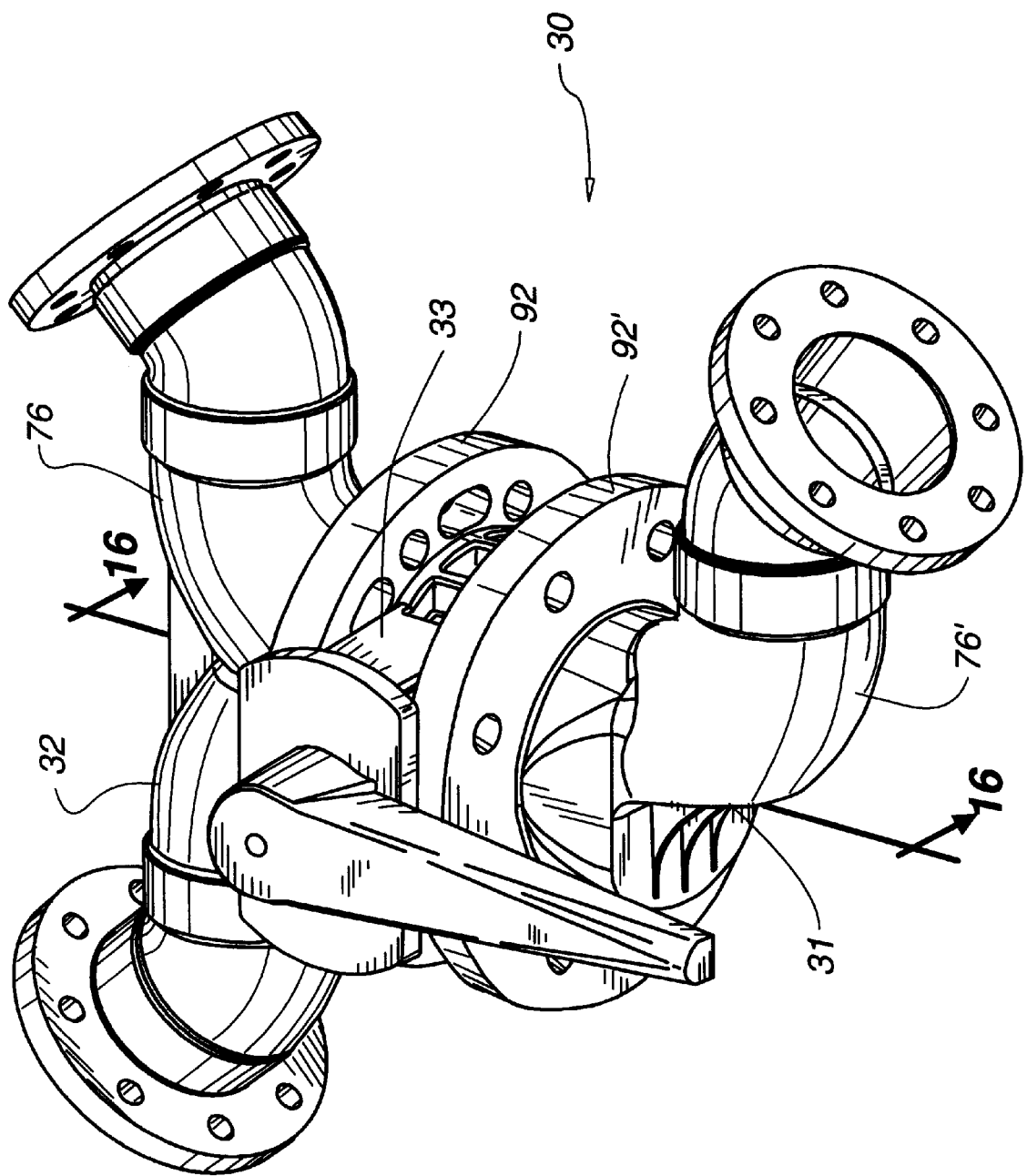
FIG. 2 is a top perspective view of a multiport valve comprising the multiport conversion system of the present invention having an "L" fitting and a "T" fitting, adapting an "off the shelf" butterfly valve to provide for selective control of fluid flow among three fluid passageways.
Figure 3:
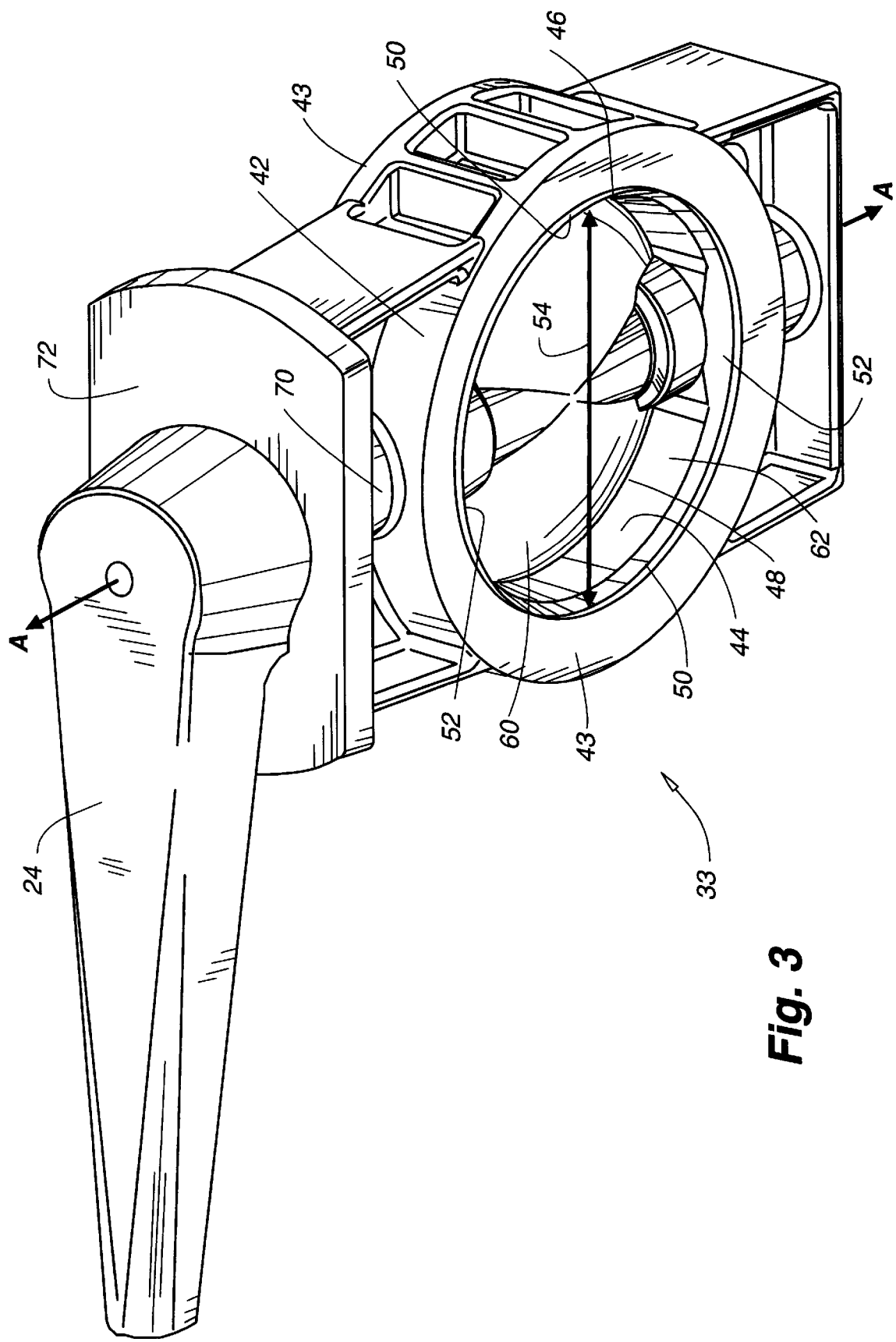
FIG. 3 is a front perspective view of an "off the shelf" butterfly valve, like that adapted for use as shown in FIGS. 1 and 2, with the multiport conversion system of the present invention, with the butterfly valve in a closed position.
Figure 4:
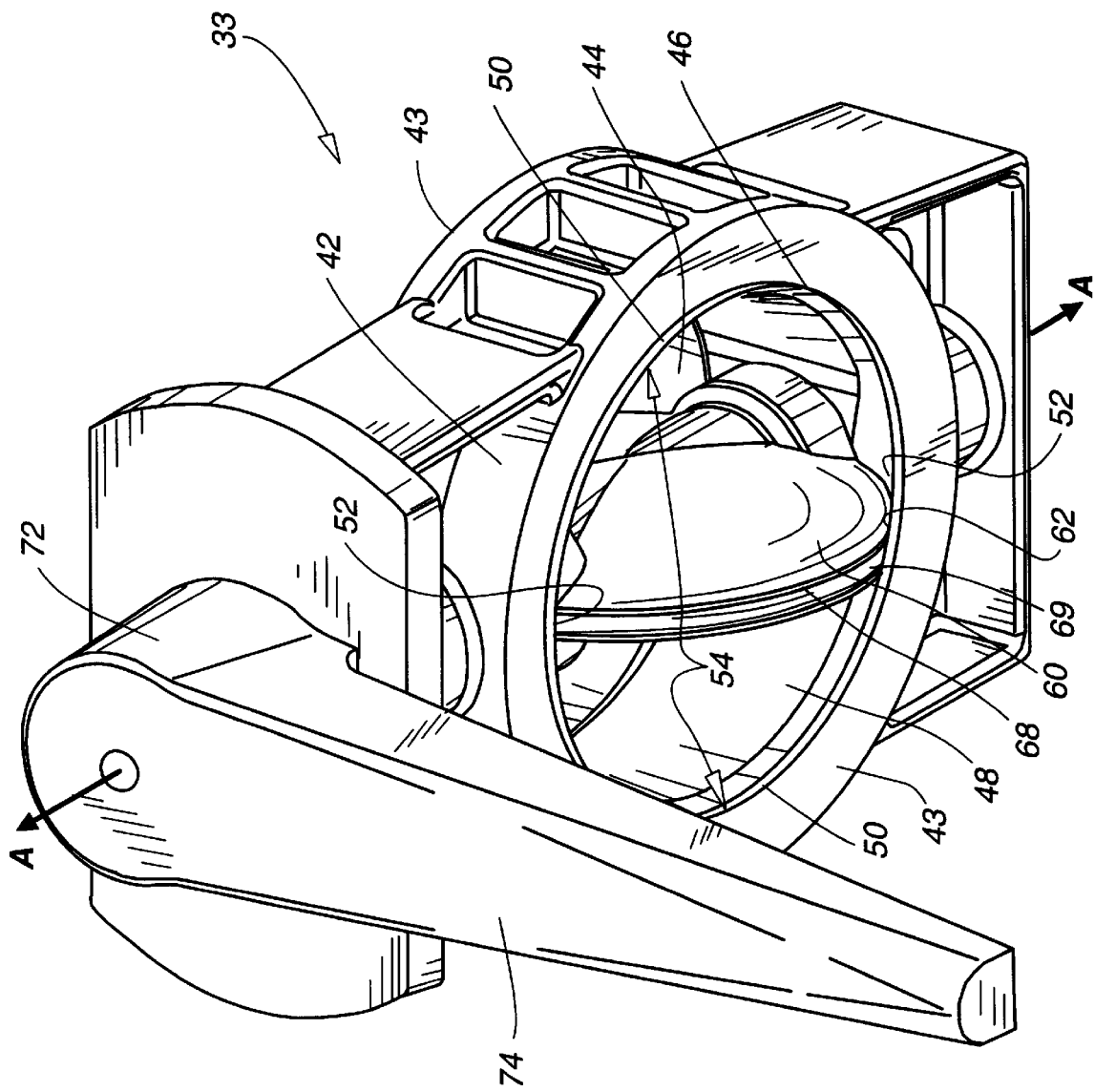
FIG. 4 is a front perspective view of the "off the shelf" butterfly valve, like that adapted for use as shown in FIG. 3, with the butterfly valve in an open position.
Figure 13:
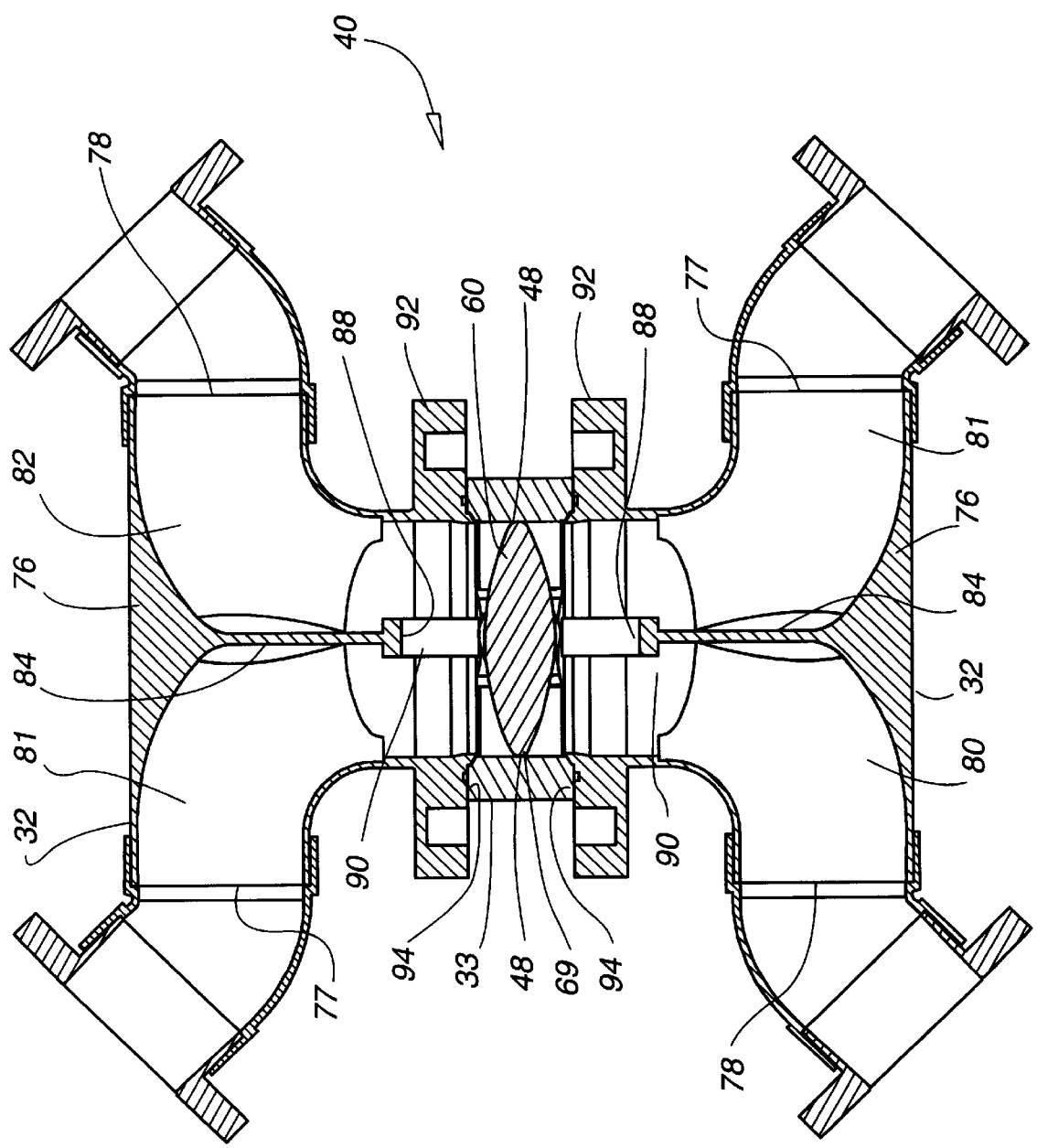
FIG. 13 is a section view of the multiport valve shown in FIG. 1, taken along the line 15—15 of FIG. 1, modified so that the butterfly valve in a closed position.
Figure 15:
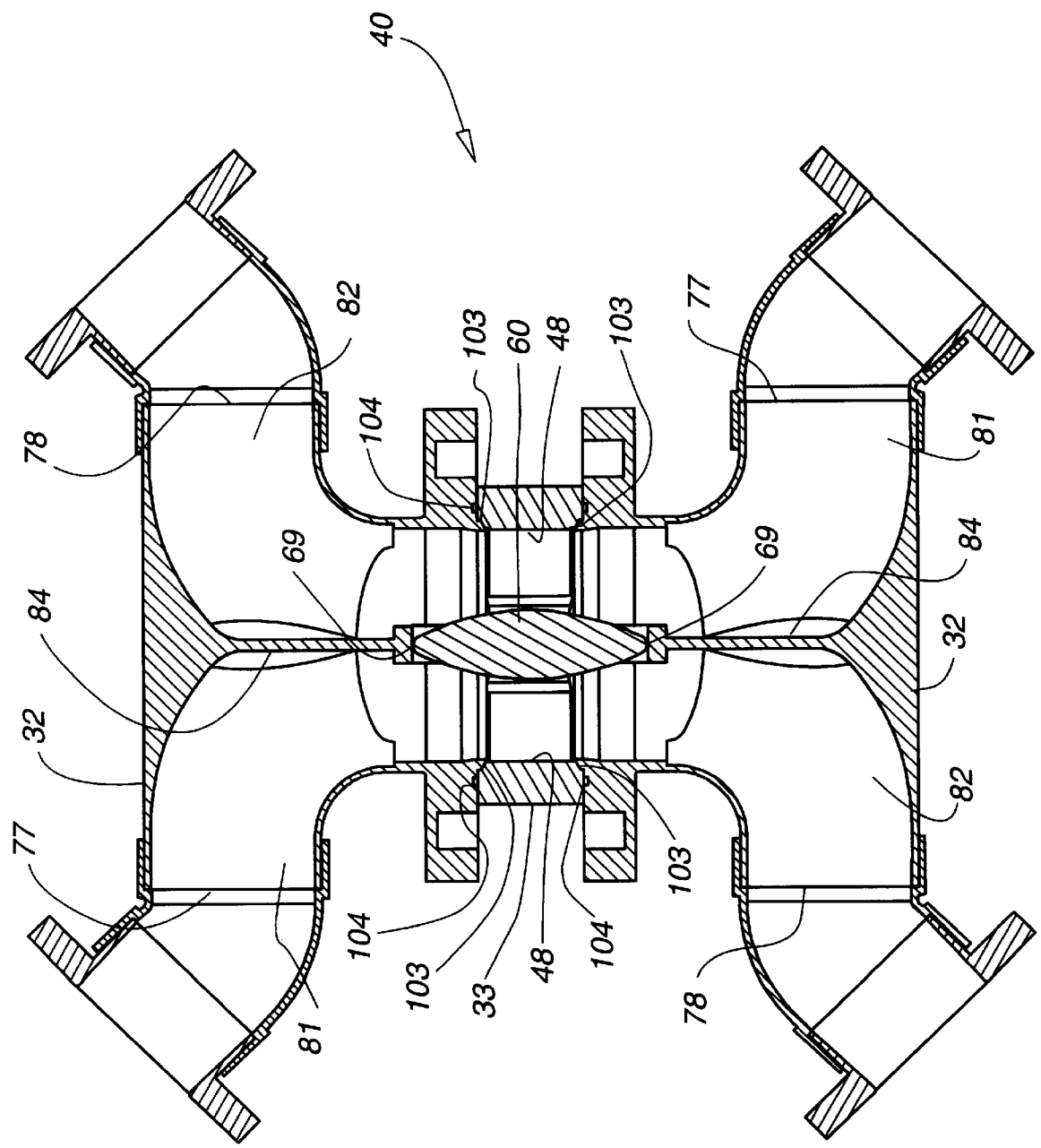
FIG. 15 is the section view of the multiport valve shown in FIG. 1, taken along the line 15—15 of FIG. 1, with the butterfly valve in an open position.
Figure 16:
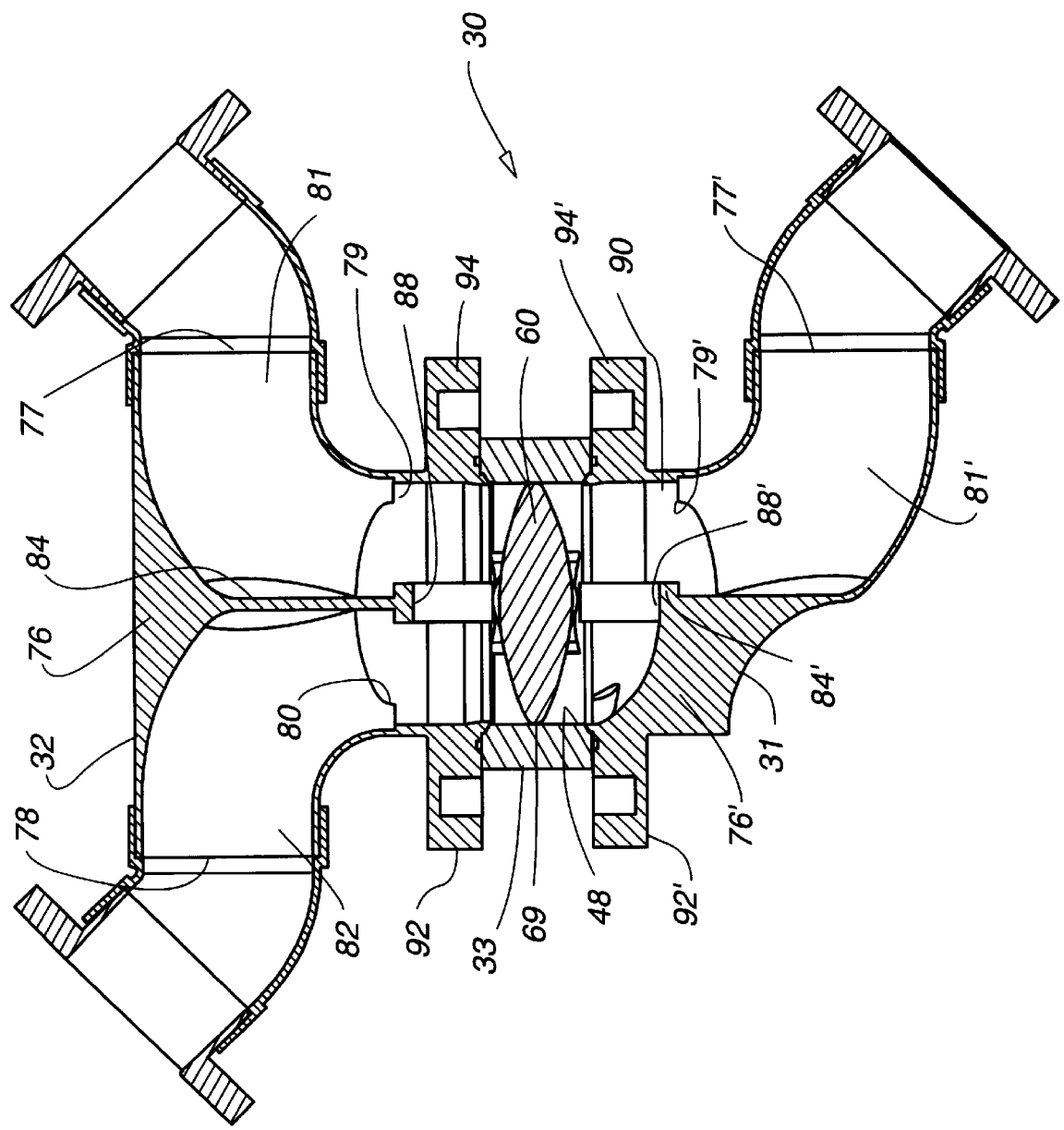
FIG. 16 is a section view of the multiport valve shown in FIG. 2, taken along the line 16—16 of FIG. 2, modified so that the butterfly valve in a closed position.
Figure 17:
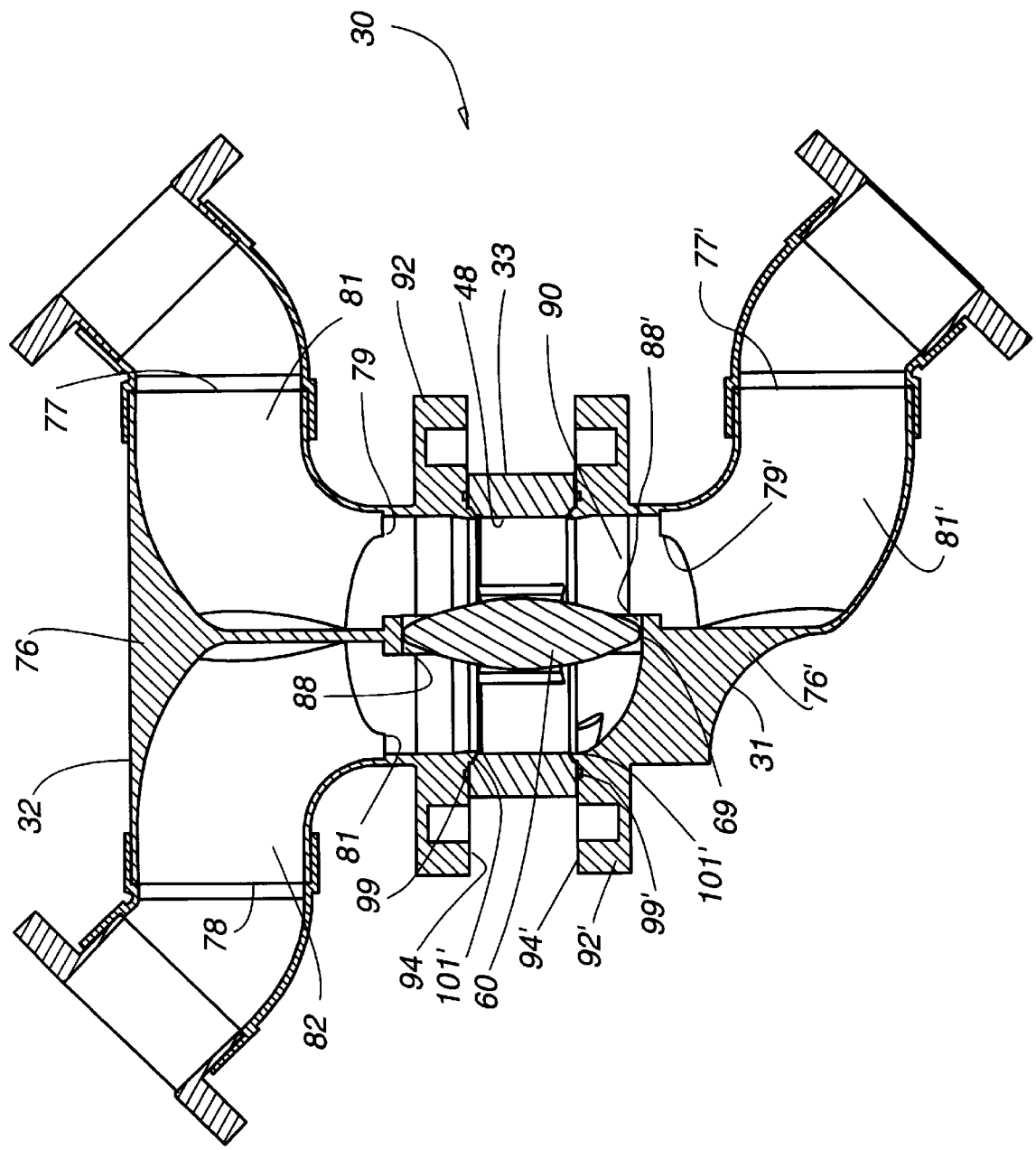
FIG. 17 is the section view of the multiport valve shown in FIG. 2, taken along the line 16—16 of FIG. 2, with the butterfly valve in an open position.
Figure 18:
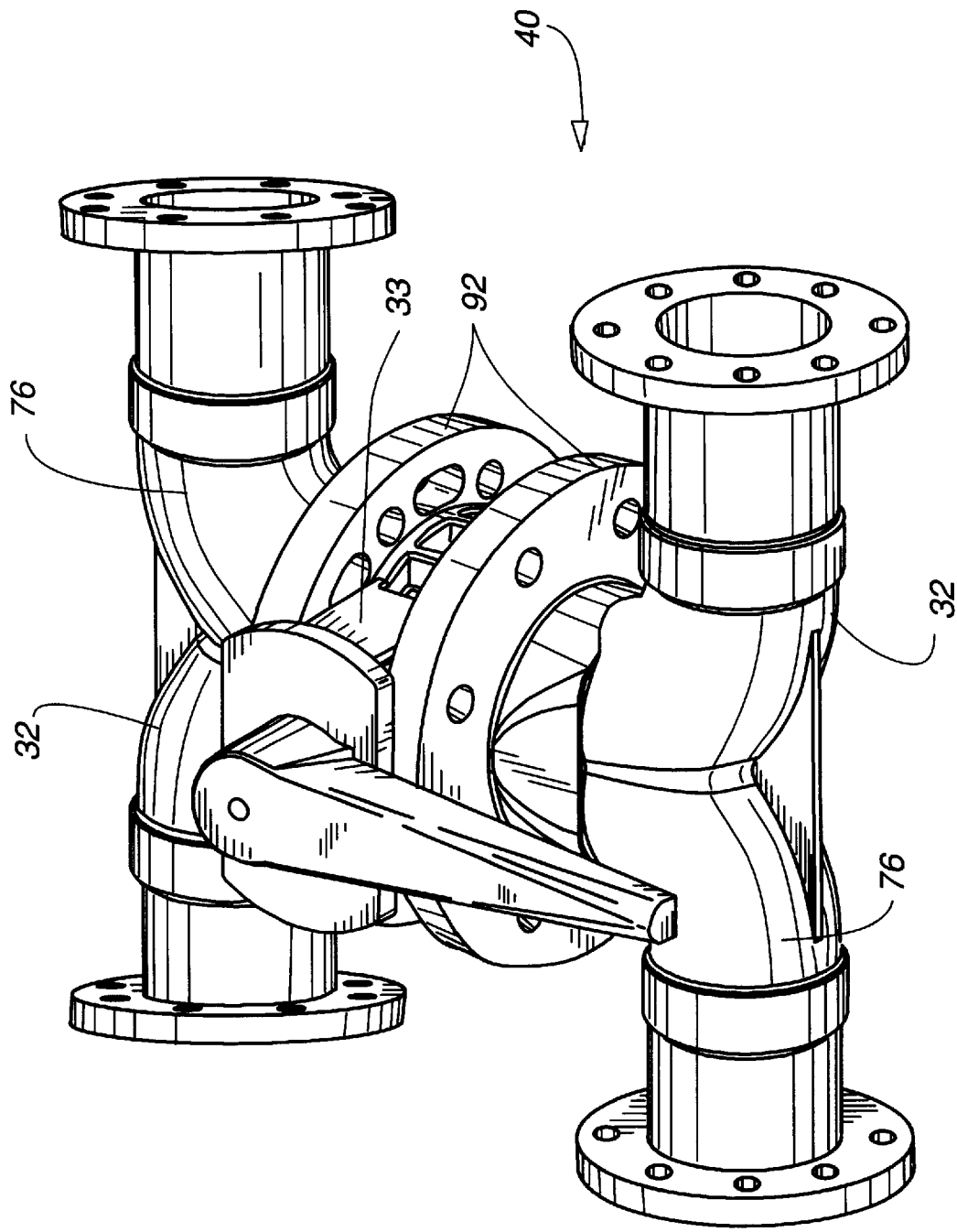
FIG. 18 is a top perspective view of an "H" configuration multiport valve incorporating a multiport conversion system of the present invention.

A presently preferred embodiment of a serviceable three-port multiport valve 30 using a multiport conversion system of the present invention is shown in FIGS. 2, 16 and 17, which includes an "L" conversion fitting 31 and a "T" conversion fitting 32, between which is sandwiched an "off the shelf" two-way butterfly valve 33 modified as shown in FIGS. 3 and 4. A presently preferred embodiment of a serviceable four-port multiport valve 40 using a multiport conversion system of the present invention is shown in FIGS. 1, 13 and 15, which includes two "T" conversion fittings 32, between which is sandwiched a butterfly valve 33. As will be appreciated from the description which follows, incorporation of a butterfly valve 33 into the multiport conversion system of the present invention converts a butterfly valve 33 conventionally used to prevent or allow fluid flow in a single line, to be used for selective flow among three or four lines. In a three line system, a butterfly valve 33 of a three-port multiport valve 30 of the present invention is used to select a flow pattern which will proportionately combine flows from two sources into a common port, proportionately divide a flow from a common port into two separate lines, or divert flow from a common port to a selected one of two lines. In a four line system, a butterfly valve 33 of four-port multiport valve 40 of the present invention is used to selectively reverse the flow through a system, by-pass flow through parts of a system, or create proportionate flow among the lines of a system.

Figure 5:
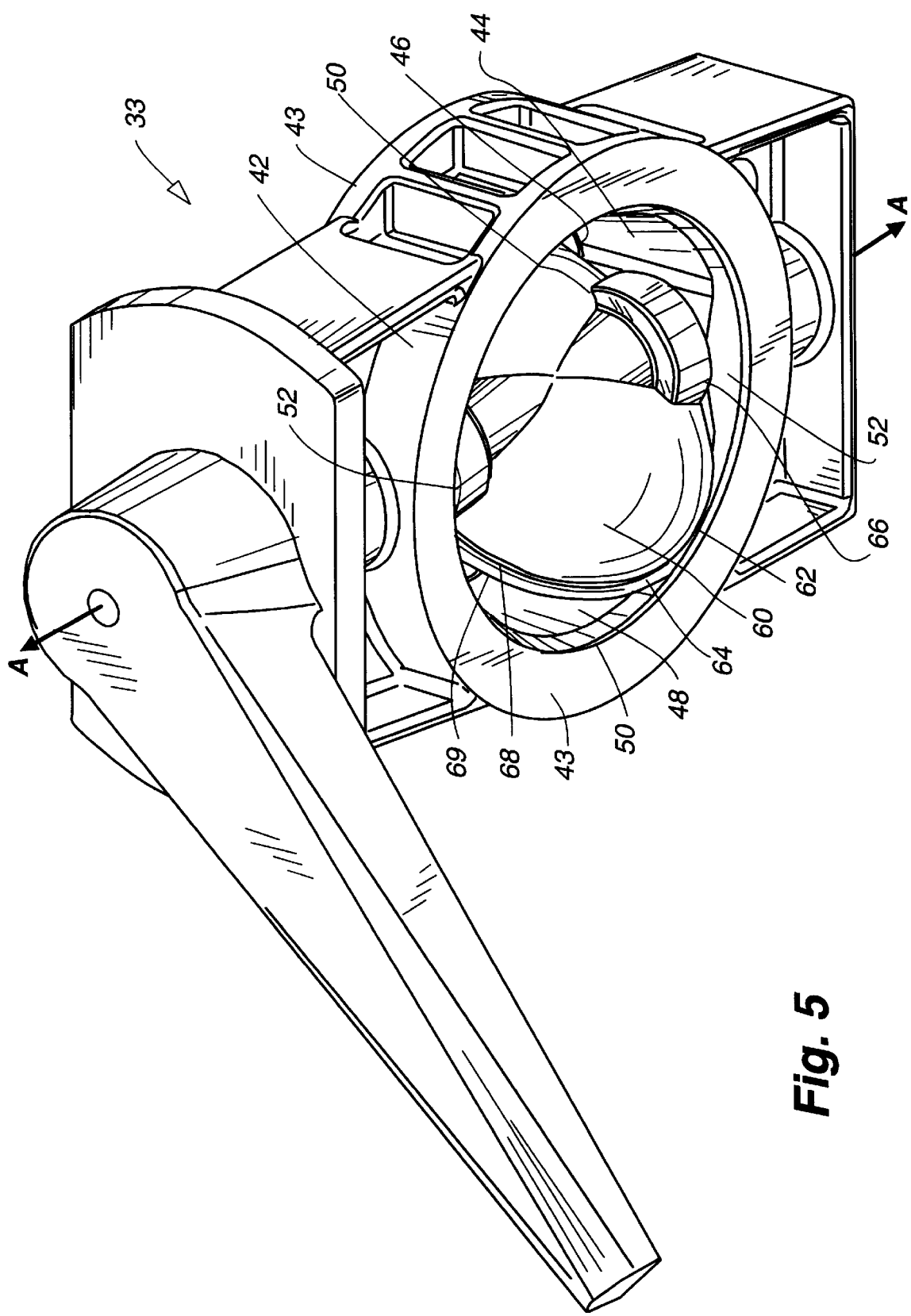
FIG. 5 is a front perspective view of the "off the shelf" butterfly valve, like that adapted for use as shown in FIG. 3, with the butterfly valve in a partially-open position.

Referring now to FIGS. 3–5 it can be seen that butterfly valve 33 includes a valve body 42 having opposing valve body faces 43 which are spaced apart and substantially parallel to each other and to a central longitudinal axis "A". A valve bore 44 is formed in valve body 42, which extends between opposing valve body faces 43 and is transverse to longitudinal axis "A". Valve bore 44 is defined by two circumferential edges 46 and a primary seat 48 therebetween. Each circumferential edge 46 has opposing arcuate side portions 50 and opposing flattened apexes 52. Each circumferential edges 46 defines a valve bore diameter 54.

Figure 14:
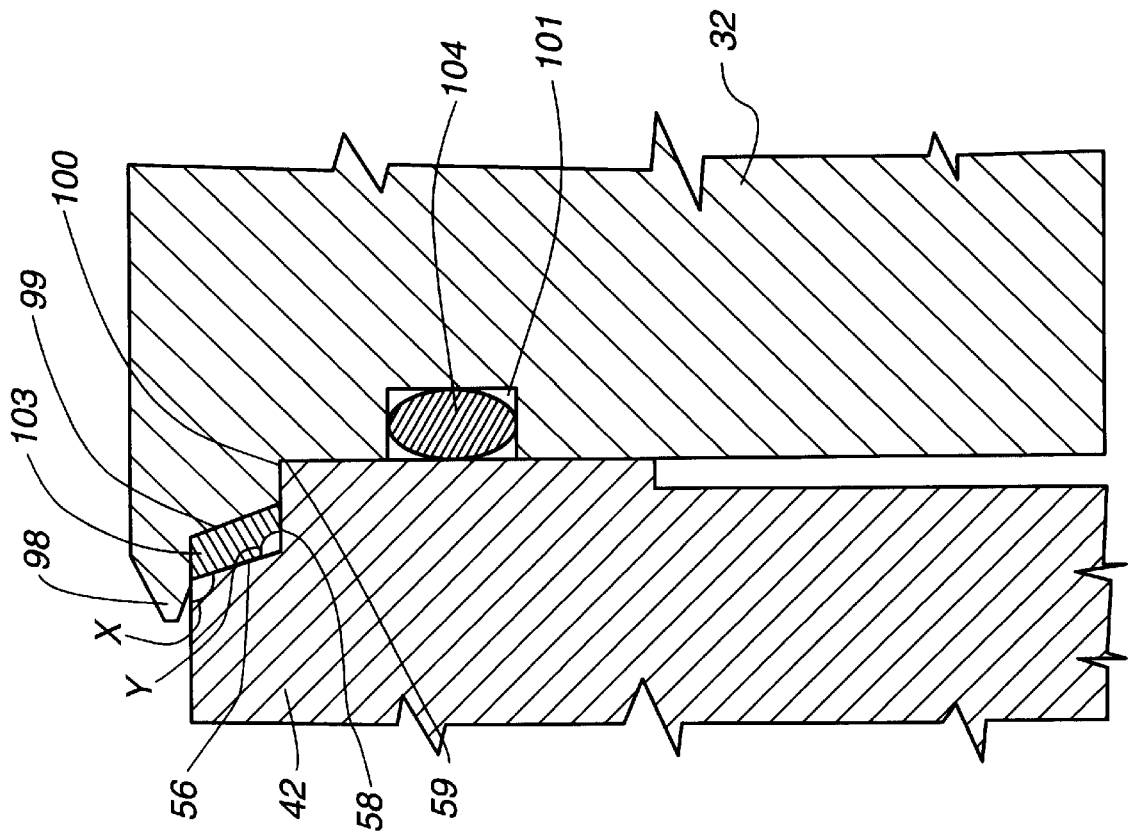
FIG. 14 is an enlarged detail of the section view of FIG. 13, showing the interface of the flange face of one of the fittings of the present invention and the valve body of the butterfly valve.

Formed in valve body 42 adjacent each circumferential edge 46 is a first gasket receiving surface 56, which in turn is adjacent to a second gasket receiving surface 58, which terminates at a circumferential alignment edge 59 (FIG. 14). In the preferred embodiment, angle "x" defined by the intersection of primary seat 48 and first gasket receiving surface 56 is an obtuse angle which is substantially similar to angle "y" defined by the intersection of first gasket receiving surface 56 and second gasket receiving surface 58.

A disc diverter 60 (FIGS. 3–5) includes an outer edge 62 having generally arcuate side edges 64 and generally flattened apical edges 66. Formed in outer edge 62 is a disc channel 64 which receiveably retains an elastomeric dynamic seal 69. Disc diverter 60 is positioned in valve bore 44 and mounted on a shaft 70 which is rotatable about longitudinal axis "A". Disc diverter 60 and shaft 70 are engaged by actuator 72, which includes handle 74.

Referring now to FIG. 3, it can be seen that when disc diverter 60 is rotated so as to be substantially parallel to valve body faces 43 elastomeric dynamic seal 69 sealingly engages primary seat 48. Fluid is prevented from flowing through valve bore 44, and butterfly valve 33 is said to be in its closed position.

Referring now to FIG. 4, it can be seen that when disc diverter 60 is rotated so as to be substantially transverse to valve body faces 43, O-ring 66 contacts flattened apexes 52 but does not contact arcuate side portions 50. Fluid is able to flow through valve bore 44, and butterfly valve 33 is said to be in its open position.

Referring now to FIG. 5, it is be seen that when disc diverter 60 is rotated to a position intermediate the closed position shown in FIG. 3 and the open position shown in FIG. 4, (e.g., 45° from either position), fluid flow is partially diverted, and butterfly valve 33 is said to be in a partially open position.

The multiport conversion system of the present invention converts an "open/closed" butterfly valve 33 into a multiport valve by sandwiching butterfly valve 33 between a "T" fitting 32 and either a second "T" fitting 32 (FIG. 1) or an "L" fitting 31 (FIG. 2). Fittings 31 and 32 are preferably constructed of polyvinyl chloride (PVC), polypropylene, or other material which is compatible with the piping to which the fittings will attach, using conventional manufacturing techniques.

Figure 6:
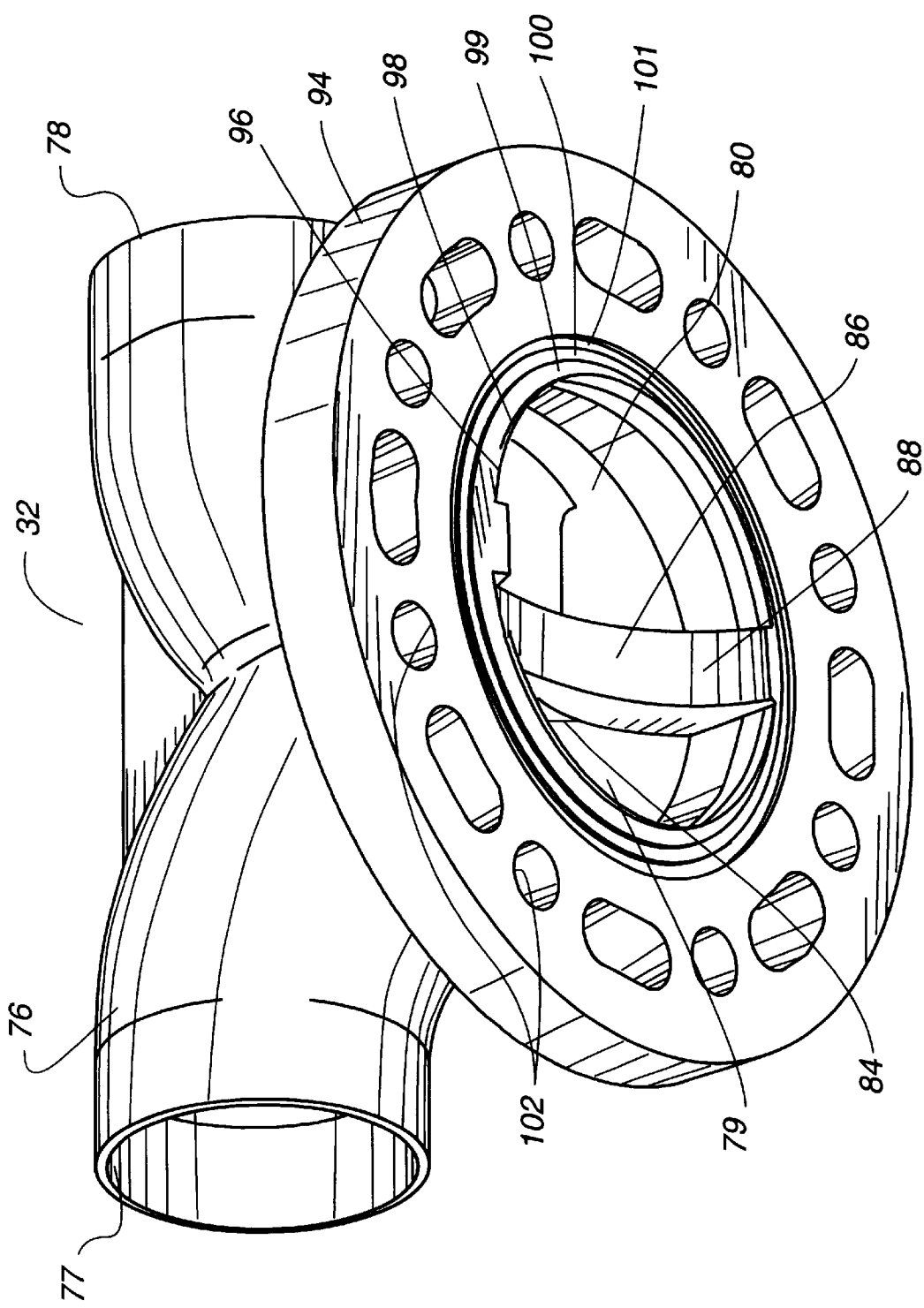
FIG. 6 is a perspective view of the "T" fitting of the present invention shown in FIGS. 1 and 2, showing the "T" fitting's flange face.
Figure 7:
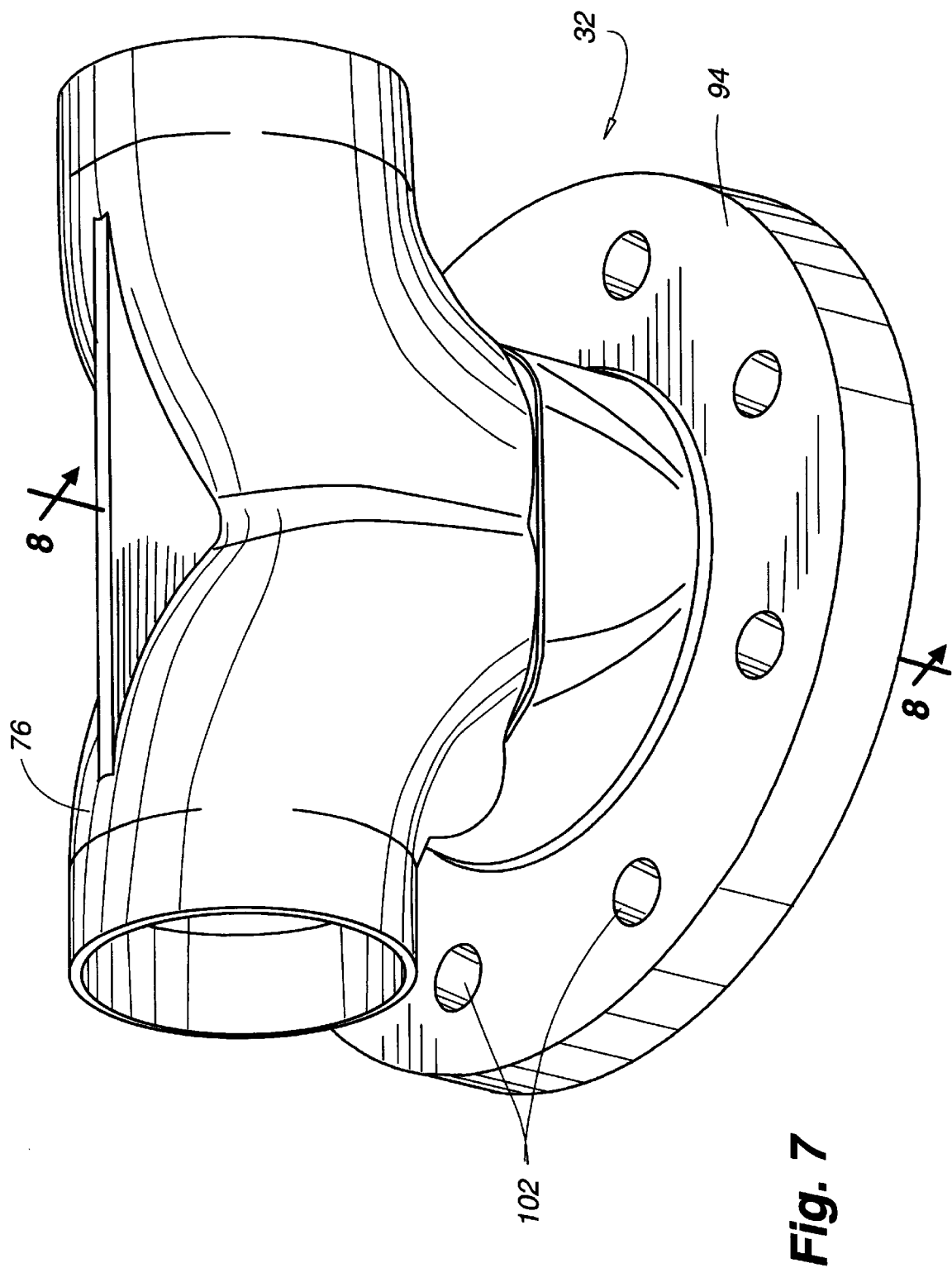
FIG. 7 is a perspective view of the "T" fitting of the present invention shown in FIGS. 1 and 2, showing the housing which defines the passageways of the "T" fitting.
Figure 8:
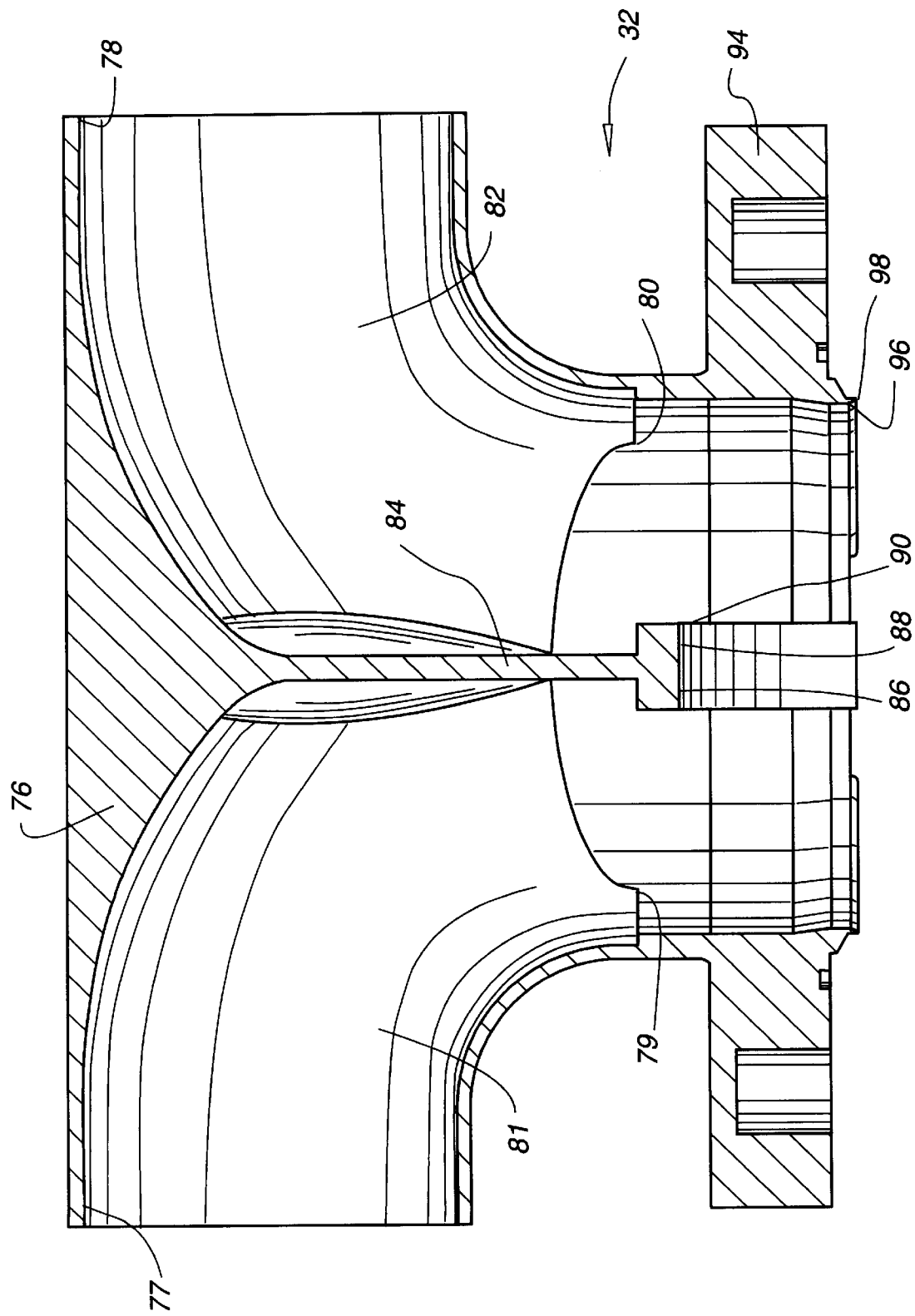
FIG. 8 is a section view of the "T" fitting shown in FIG. 7 taken substantially along the line 8—8 of FIG. 7.

Referring now to FIGS. 6–8, it can be seen that "T" fitting 32 includes housing 76 which defines external ports 77 and 78, internal ports 79 and 80, and passageways 81 and 82, which extend from ports 77 to 79 and 78 to 80, respectively. The terminations of housing 76 at external ports 77 and 78 are sized to accommodate standard pipe fittings 83. Passageways 81 and 82 are separated internally by an internal wall 84, formed in housing 76. Wall 84 terminates at a concave leading surface 86, which defines a secondary seat 88 of a multiport conversion system of the present invention. Internal ports 79 and 80 join at secondary seat 88, to form a common internal port 90.

Circumscribing common internal port 90 is an outwardly extending annular flange 92 having a flange face 94. Flange 92 has an inner diameter 96 from which perpendicularly project a pair of opposing shoulders 98. Adjacent inner diameter 96 and partially circumscribed by shoulder 98 is a circumferential gasket receiving shelf 99. A valve body alignment channel 100 is also formed in flange face 94 so as to circumscribe gasket receiving shelf 99. A generally "U"-shaped "O"-ring receiving channel 101 is also formed in flange face 94, and circumscribes alignment channel 100. A plurality of fastener receiving holes 102 are formed in annular flange 92.

Figure 9:
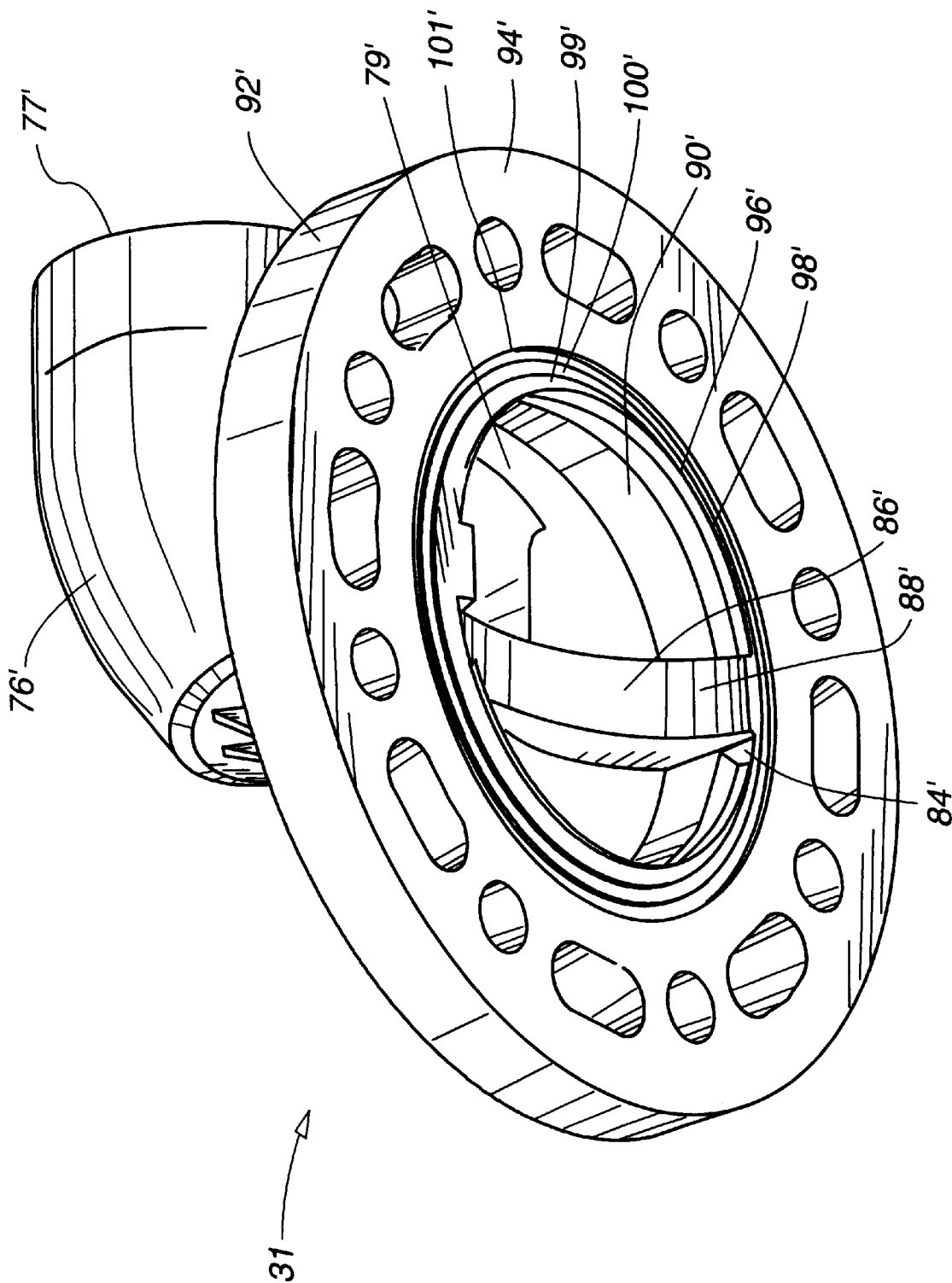
FIG. 9 is a perspective view of the "L" fitting of the present invention shown in FIG. 2, showing the "L" fitting's flange face.
Figure 10:
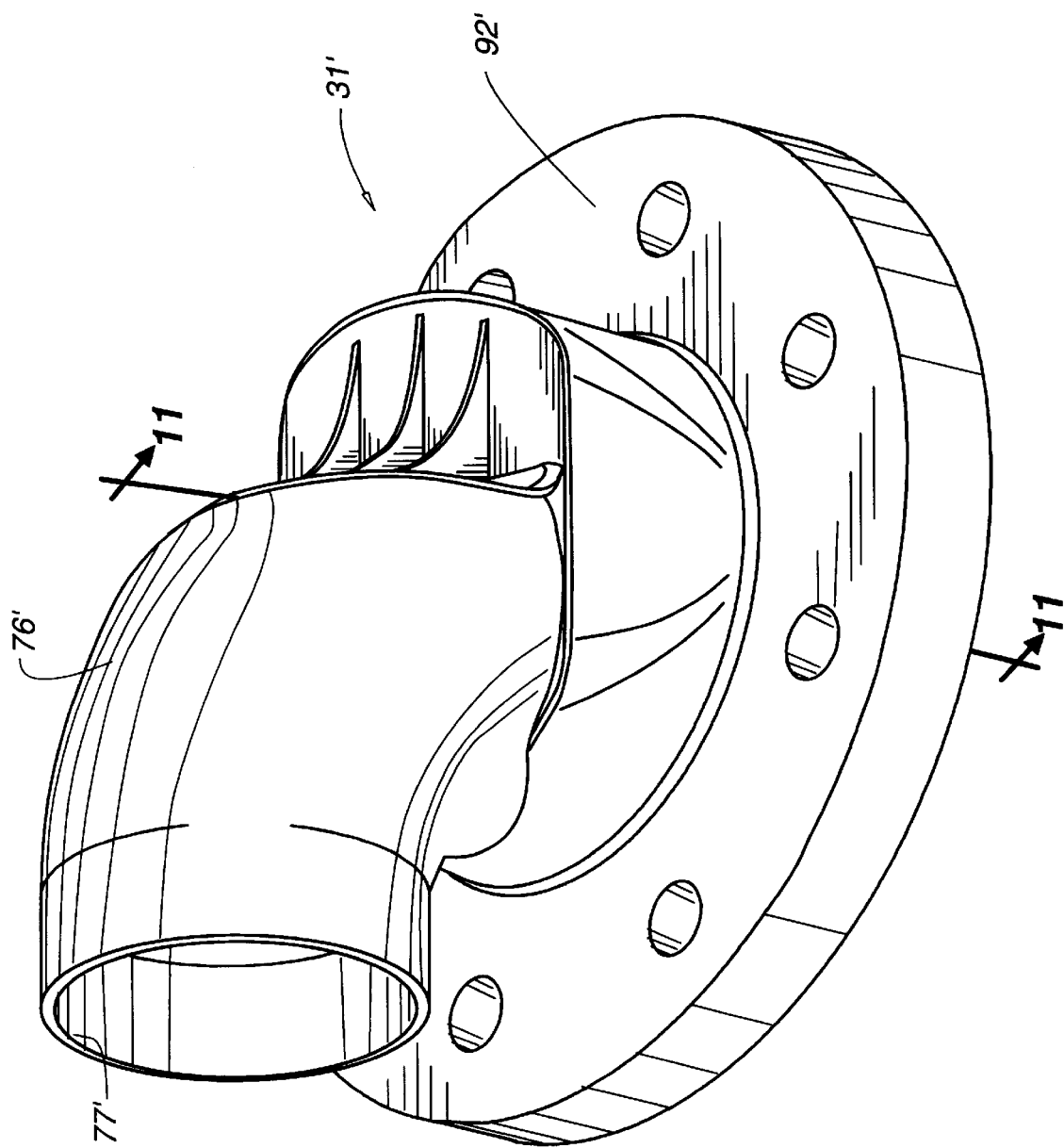
FIG. 10 is a perspective view of the "L" fitting of the present invention shown in FIG. 2, showing the housing which defines the "L" fitting's passageway.
Figure 11:
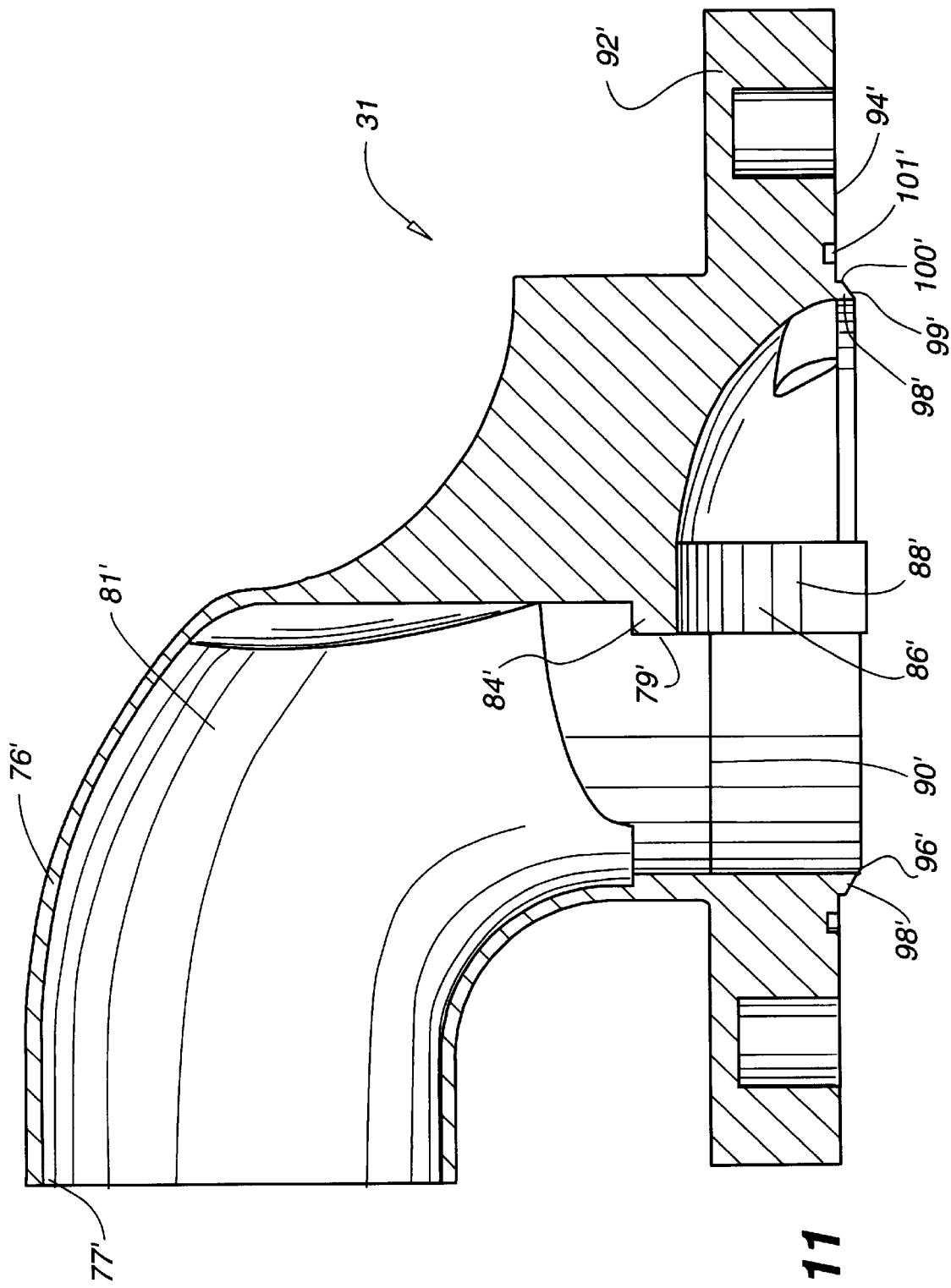
FIG. 11 is a section view of the "L" fitting shown in FIG. 10 taken substantially along the line 11—11 of FIG. 10.

Referring now to FIGS. 9–11, it can be seen that "L" fitting 31 includes housing 106 which defines external port 77', internal port 79', and passageway 81", which extends from ports 77' to 79'. The termination of housing 106 at external port 77' is sized to accommodate standard pipe fittings 83'. Wall 84' is formed in housing 106 adjacent internal port 79', and terminates in a concave leading surface 86', which defines a secondary seat 88' of a multiport conversion system of the present invention. Internal port 79' extends beyond secondary seat 88', to form a common internal port 90'. Circumscribing common internal port 90' is an outwardly extending annular flange 92' having a flange face 94'. Flange 92' has an inner diameter 96' from which perpendicularly project a pair of opposing shoulders 98'. Adjacent inner diameter 96' and partially circumscribed by shoulder 98' is a circumferential gasket receiving shelf 99'. A valve body alignment channel 100' is also formed in flange face 94' so as to circumscribe gasket receiving shelf 99'. A generally "U"-shaped "O"-ring receiving channel 101' is also formed in flange face 94', and circumscribes alignment channel 100'. A plurality of fastener receiving holes 102' are formed in annular flange 92'.

Figure 12:
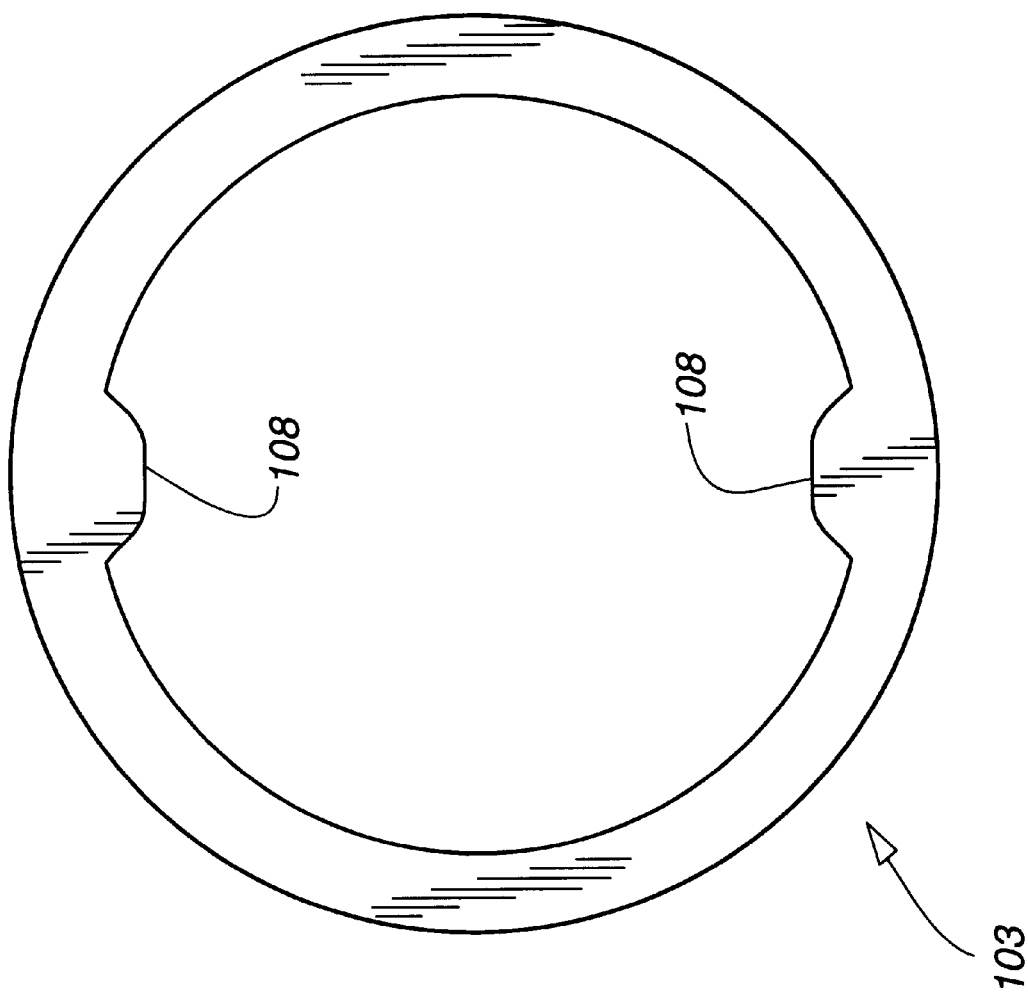
FIG. 12 is a top plan view of the preferred gasket used with the "T" fitting and "L" fitting of the present invention.

Preferred embodiments of the multiport conversion systems of the present invention include a pair of gaskets 103 (FIG. 12), a pair of O-rings 104, a plurality of bolts 105, washers 106 and nuts 107. Gaskets 103 are preferably die cut from a teflon sheet, and are ring-shaped, with opposing tabs 108 extending centrally inwardly from the inner circumferential edge. O-rings 104 are sized to fit O-ring receiving channel 102

To convert a butterfly valve 33 into a four-port multiport valve 40 like that shown in FIGS. 1 and 13, a pair of fittings 32, a pair of gaskets 103, and a pair of O-rings 104 are obtained. A first gasket 103 is placed in gasket receiving shelf 99 of one of the fittings 32 and a first O-ring 104 is placed in the adjacent O-ring receiving channel 101. A second gasket 103 is placed in gasket receiving shelf 99 of the second fitting 32 and a second O-ring 104 is placed in the adjacent O-ring receiving channel 101. Butterfly valve 33 is then positioned on one of the fittings 32, with one of valve body faces 43 contacting flange face 94, circumferential alignment edge 59 of said valve body face 43 snugly received in valve body alignment channel 100 of said flange face 94, and gasket 103 positioned in an annular, substantially parallelepiped chamber 110 defined by gasket receiving shelf 99, first gasket receiving surface 56 and second gasket receiving surface 58.

The second fitting 32 is then positioned on the second of the valve body faces 43 of butterfly valve 33, with the second of the valve body faces 43 contacting flange face 94 of the second fitting 32 and circumferential alignment edge 59 of the second valve body face 43 snugly received in valve body alignment channel 100 of the flange face 94 of the second fitting 32. The second gasket 103 in then positioned in the annular, substantially parallelepiped chamber 110 defined by gasket receiving shelf 99, first gasket receiving surface 56 and second gasket receiving surface 58.

Bolts 105 are then positioned in corresponding fastener receiving holes 102 of the opposing flanges 92. Washers 106 and nuts 107 are inserted, and bolts 105 tightened, to securely sandwich butterfly valve 33 between the pair of fittings 32. It should be understood that although in this configuration fittings 32 are releasably attached to each other with a predetermined space maintained between opposing flange faces 94, fittings 32 may be constructed with minimal or no space between opposing flange faces 94.

As tightening progresses, the pair of gaskets 103 are compressed in the chambers 110 to form a pair of annular parallelepiped shaped chambers 110, and assume a substantially parallelogram-shaped cross section. The seam formed between valve body 42 and flange faces 94, adjacent valve bore diameter 54 is thereby filled, with the circumferential inner edge of gaskets 103 prevented from displacement during subsequent fluid flow or disc diverter 60 movement by shoulders 98.

Once multiport valve 40 is assembled as described above, various flow patterns can be selectively controlled by rotation of disc diverter 60. It will be seen that the disc diverter positions described herein as closed, open or partially open. Such terms literally relate to the positions of a disc diverter in a two way butterfly valve having a single line flowing therethrough. It should be understood that while the same terminology is adopted herein to describe the analogous positions of disc diverter 60 within valve body 42, such terminology is not necessarily indicative of the flow pattern established by disc diverter 60 as positioned in the multiport valves of the present invention.

Once assembled as described above, as can be seen by reference to FIG. 13, when disc diverter 60 is in its closed position, disc diverter 60 is in sealing engagement with primary seat 48. Passageways 81 and 82 of the first fitting 32 are in fluid communication with each other through common internal port 90 of the first fitting 32. Similarly, passageways 81 and 82 of the second fitting 32 are in fluid communication with each other through common internal port 90 of the second fitting 32. However, disc diverter 60 prevents fluid communication between the passageways 81 and 82 of the first fitting 32 and the passageways 81 and 82 of the second fitting 32.

Referring now to FIG. 15, it can be seen that when disc diverter 60 is in its open position, disc diverter 60 is in sealing engagement with secondary seats 88 of both the first and second fittings 32. In this configuration, the pair of opposing passageways 81 of the fittings 32 are in fluid communication, and the pair of opposing passageways 82 of the fittings 32 are in fluid communication. However, fluid communication is generally prevented between passageways 81 and 82 of a single fitting 32.

Disk diverter may also be rotated to a position intermediate its open and closed positions, for example, at 45° from either position, such as is shown in FIG. 3. Under these conditions, fluid flow is partially diverted, with fluid in the various lines proportionally combined.

To convert a butterfly valve 33 into a three-port multiport valve 30 like that shown in FIGS. 2 and 16, one fitting 31, one fitting 32, a pair of gaskets 103, and a pair of O-rings 104 are obtained. A first gasket 103 is placed in gasket receiving shelf 99 of fitting 32 and a first O-ring 104 is placed in the adjacent O-ring receiving channel 101. A second gasket 103 is placed in gasket receiving shelf 99' of fitting 31 and a second O-ring 104 is placed in the adjacent O-ring receiving channel 101'. Butterfly valve 33 is then positioned on fitting 32, with one of valve body faces 43 contacting flange face 94, circumferential alignment edge 59 of said valve body face 43 snugly received in valve body alignment channel 100 of said flange face 94, and gasket 103 located in the annular, substantially parallelepiped chamber 110 defined by gasket receiving shelf 99, first gasket receiving surface 56 and second gasket receiving surface 58.

Fitting 31 is then positioned on the second of the valve body faces 43 of butterfly valve 33, with the second of the valve body faces 43 contacting flange face 94' of fitting 31, and circumferential alignment edge 59 of the second valve body face 43 snugly received in valve body alignment channel 100' of flange face 94'. Second gasket 103 is positioned in the annular, substantially parallelepiped chamber 110' defined by gasket receiving shelf 99' of fitting 31, and first gasket receiving surface 56 and second gasket receiving surface 58 of valve body 42.

Bolts 105 are then positioned in corresponding fastener receiving holes 102 of the opposing flanges 92. Washers 106 and nuts 107 are inserted, and bolts 105 tightened, to securely sandwich butterfly valve 33 between fittings 31 and 32. As tightening progresses, the pair of gaskets 103 are compressed in the chambers 110 and 110' to form a pair of annular parallelepiped shaped gaskets having substantially parallelogram-shaped cross sections. The seam formed between valve body 42 and flange faces 94 and 94' is thereby filled, with the circumferential inner edge of gaskets 103 prevented from displacement during subsequent fluid flow or disc diverter 60 movement by shoulders 98 and 98'.

Once assembled as described above, as can be seen by reference to FIG. 16, when disc diverter 60 is in its closed position, disc diverter 60 is in sealing engagement with primary seat 48. Passageways 81 and 82 of fitting 32 are in fluid communication with each other through common internal port 90, but are not in fluid communication with passageway 81' of fitting 32, which is occluded by disc diverter 60.

Referring now to FIG. 17, it can be seen that when disc diverter 60 is in its open position, disc diverter 60 is in sealing engagement with secondary seats 88 and 88' of fittings 32 and 31, respectively. In this configuration, passageways 81 and 81' of fittings 31 and 32, respectively, are in fluid communication with each other, but not with passageway 82 of fitting 32.

Development of the multiport conversion system for an "off the shelf" butterfly valve, as described above, was heretofore problematic because of internal leakage inherently created at the interface of a butterfly valve 33 and the multiport conversion housing adapted to surround and provide a dynamic secondary seat for disc diverter 60. This leakage primarily occurs when disc diverter 60 is in its open position, and the point of intersection of flattened apical edges 66 and arcuate side edges 64 of disc diverter 60 create small spaces just inside circumferential edges 46 of valve bore 44, an area into which sealing engagement of an external fitting would not typically extend. This problem was recognized, and a unique arrangement developed which includes gaskets 103, shoulder 98, gasket receiving shelf 99 and first and second gasket receiving surfaces 56 and 58.

The multiport conversion system of the present invention provides "off the shelf" butterfly valves with multiport functionality, in a manner which allows for servicing of the butterfly valve, the component passageways, and gasket and O-ring components. In particular, the use of a plurality of manually attachable and removable fasteners, for example, bolts 105, washers 106 and nuts 107, allows for repeated servicing and/or replacement of multivalve as described above.

Presently preferred embodiments of the present invention and many of its improvements have been described with a degree of particularity. It should be understood, however, that the present invention is defined by the spirit and scope of the following claims.

What is claimed is:

1. A serviceable multiport conversion system for a butterfly valve, the butterfly valve having a butterfly valve body including a longitudinal axis thereof, a cylindrical valve bore formed therethrough transverse to the longitudinal axis, the bore defining a pair of opposing butterfly ports, each having a butterfly port diameter and a circumferential edge thereof, and a disc diverter attached to an actuator, positioned in the valve bore and rotatable about the longitudinal axis, the disc diverter selectively movable by the actuator to a first or closed position where the disc diverter is in sealing engagement with a primary seat of the butterfly valve body, to a second or fully open position 90° rotated from the first position, and to a plurality of intermediate positions between the closed position and the fully open position, said conversion system comprising:

a first fitting having a first passageway and a second passageway, said first passageway extending from a first piping port to a first internal port both defined by said first fitting, said second passageway extending from a second piping port to a second internal port both defined by said first fitting, said first and second internal ports joining at a first common internal port also defined by said first fitting, said first fitting including a first wall defining a first secondary seat and separating said first passageway from said second passageway, said first fitting further defining an annular first flange with a first flange face circumscribing said first common internal port and having a first flange inner diameter coextensive with said first common internal port; and a second fitting having a third passageway extending from a third piping port to a third internal port both defined by said second fitting, said third internal port terminating a second common port also defined by said second fitting, said second fitting including a second wall defining a second secondary seat and an annular second flange having a second flange face circumscribing said second common internal port, said second flange having a second flange inner diameter coextensive with said second common internal port, wherein (i) the butterfly valve is removably positionable in sealing engagement, sandwiched between said first flange face and said second flange face, (ii) said first flange inner diameter is substantially co-extensive with one of the butterfly ports and said second flange inner diameter is substantially co-extensive with the opposing butterfly port, (iii) said first flange of said first fitting is releasably attachable to said second flange of said second fitting, (iv) when the butterfly valve is in its fully closed position, said first and second passageways are in fluid communication with each other but not with said third passageway, and (v) when the butterfly valve in its fully open position, said disc diverter is in sealing engagement with said first and second secondary seats, and said third passageway is in fluid communication with at least one of said first or second passageways.

2. The serviceable multiport conversion system of claim 1, wherein each of said first and second flanges have formed therein a plurality of corresponding holes and said multiport conversion system further comprises:

a plurality of releasable fasteners, each adapted for positioning in a pair of corresponding holes in said first and second flanges and releasably attaching said first flange of said first fitting to said second flange of said second fitting.

3. The serviceable multiport conversion system of claim 1, wherein said second fitting further comprises:
a fourth passageway defined by said second fitting and extending from a fourth piping port to a fourth internal port, both defined by said second fitting,
wherein said third and fourth internal ports join at said second common internal port, said second wall separates said third passageway from said fourth passageway, when the butterfly valve is in its fully closed position, said first and second passageways are in fluid communication with each other and said third and fourth passageways are in fluid communication with each other, but fluid communication is prevented between said first passageway and said third and fourth passageways and between said second passageway and said third and fourth passageways, and when the butterfly valve in its fully open position, said disc diverter is in sealing engagement with said first and second secondary seats, said first passageway is in fluid communication with said third passageway and said second passageway is in fluid communication with said fourth passageway.

4. The serviceable multiport conversion system of claim 3, wherein each of said first and second flanges have formed therein a plurality of corresponding holes and said multiport conversion system further comprises:
a plurality of releasable fasteners, each adapted for positioning in a pair of corresponding holes in said first and second flanges and releasably attaching said first flange of said first fitting to said second flange of said second fitting.

5. The multiport conversion system of claim 3 wherein the butterfly valve has a pair of circumferential gasket receiving channels formed in opposing sides of the valve body, one each adjacent the circumferential edge thereof, a first gasket receiving shelf is formed in the first flange face and a second gasket receiving shelf is formed in the second flange face, wherein the multiport system further comprises:
first and second gaskets, each having an annular inner edge and a pair of opposing tabs.

6. The multiport conversion system of claim 1 wherein the butterfly valve has a pair of circumferential gasket receiving channels formed in opposing sides of the valve body, one each adjacent the circumferential edge thereof, a first gasket receiving shelf is formed in the first flange face and a second gasket receiving shelf is formed in the second flange face, wherein the multiport system further comprises:
first and second gaskets, each having an annular inner edge and a pair of opposing tabs.

7. A multiport conversion system for a butterfly valve, the butterfly valve having a butterfly valve body including a longitudinal axis thereof, a cylindrical valve bore formed therethrough transverse to the longitudinal axis, the bore defining a pair of opposing butterfly ports, each having a butterfly port diameter, a circumferential edge thereof, and a disc diverter attached to an actuator, positioned in the valve bore and rotatable about the longitudinal axis, the disc diverter selectively movable by the actuator to a first or closed position where the disc diverter is in sealing engagement with a primary seat of the butterfly valve body, to a second or fully open position 90° rotated from the first position, and to a plurality of intermediate positions between the closed position and the fully open position, said conversion system comprising:
a first fitting having a first passageway and a second passageway, said first passageway extending from a first piping port to a first internal port both defined by said first fitting, said second passageway extending from a second piping port to a second internal port both defined by said first fitting, said first and second internal ports joining at a first common internal port also defined by said first fitting, said first fitting including a first wall defining a first secondary seat and separating said first passageway from said second passageway, said first fitting further defining an annular first flange circumscribing said first common internal port, said annular first flange having a first flange inner diameter coextensive with said first common internal port; and
a second fitting having a third passageway extending from a third piping port to a third internal port both defined by said second fitting, said third internal port terminating a second common port also defined by said second fitting, said second fitting including a second wall defining a second secondary seat and an annular second flange circumscribing said second common internal port, said second flange having a second flange inner diameter coextensive with said second common internal port,
wherein when the butterfly valve is removably positionable in sealing engagement between said first flange of said first fitting and said second flange of said second fitting, (i) said first flange inner diameter is substantially co-extensive with one of the butterfly ports and said second flange inner diameter is substantially co-extensive with the opposing butterfly port, (ii) said first flange of said first fitting is attached to but spaced apart from said second flange of said second fitting, (iii) when the butterfly valve is in its fully closed position, said first and second passageways are in fluid communication with each other but not with said third passageway, and (iv) when the butterfly valve in its fully open position, said disc diverter is in sealing engagement with said first and second secondary seats, and said third passageway is in fluid communication with at least one of said first or second passageways.

8. The multiport conversion system of claim 7, wherein each of said first and second flanges have formed therein a plurality of corresponding holes and said multiport conversion system further comprises:
a plurality of releasable fasteners, each adapted for positioning in a pair of corresponding holes in said first and second flanges and releasably attaching said first flange of said first fitting to said second flange of said second fitting.

9. The multiport conversion system of claim 7 wherein the butterfly valve has a pair of first and second gasket receiving surfaces formed in each of the opposing sides of the valve body adjacent the circumferential edge thereof, a first gasket receiving shelf is formed in the first flange face and a second gasket receiving shelf is formed in the second flange face, wherein formed in said first flange face is an annular first shoulder portion adjacent said first flange inner diameter, and an annular first gasket channel circumscribing said first shoulder portion and spaced apart from said first flange inner diameter, and wherein formed in said second flange face is an annular second shoulder portion adjacent said second flange inner diameter, and an annular second gasket channel circumscribing said second shoulder portion and spaced apart from said second flange inner diameter, and wherein said multiport conversion system further comprises:
first and second gaskets, each having an annular inner edge and a pair of opposing tabs,
wherein when said butterfly valve is positioned between said first and second fittings, said first gasket is compressed in a first chamber defined by adjacent first and second gasket receiving surfaces of the butterfly valve and said first gasket receiving shelf of said first fitting, and said second gasket is compressed in a chamber defined by the other of the adjacent first and second gasket receiving surfaces of the butterfly valve and said second gasket receiving shelf of second first fitting.

10. The multiport conversion system of claim 7, wherein said second fitting further comprises:

a fourth passageway defined by said second fitting and extending from a fourth piping port to a fourth internal port, both defined by said second fitting, wherein said third and fourth internal ports join at said second common internal port, said second wall separates said third passageway from said fourth passageway, when the butterfly valve is in its fully closed position, said first and second passageways are in fluid communication with each other and said third and fourth passageways are in fluid communication with each other, but fluid communication is prevented between said first passageway and said third and fourth passageways and between said second passageway and said third and fourth passageways, and when the butterfly valve in its fully open position, said disc diverter is in sealing engagement with said first and second secondary seats, said first passageway is in fluid communication with said third passageway and said second passageway is in fluid communication with said fourth passageway.

11. The multiport conversion system of claim 10, wherein each of said first and second flanges have formed therein a plurality of corresponding holes and said multiport conversion system further comprises:

a plurality of releasable fasteners, each adapted for positioning in a pair of corresponding holes in said first and second flanges and releasably attaching said first flange of said first fitting to said second flange of said second fitting.

12. The multiport conversion system of claim 10 wherein the butterfly valve has a pair of first and second gasket receiving surfaces formed in each of the opposing sides of the valve body adjacent the circumferential edge thereof, a first gasket receiving shelf is formed in the first flange face and a second gasket receiving shelf is formed in the second flange face, wherein formed in said first flange face is an annular first shoulder portion adjacent said first flange inner diameter, and an annular first gasket channel circumscribing said first shoulder portion and spaced apart from said first flange inner diameter, and wherein formed in said second flange face is an annular second shoulder portion adjacent said second flange inner diameter, and an annular second gasket channel circumscribing said second shoulder portion and spaced apart from said second flange inner diameter, and wherein said multiport conversion system further comprises:

first and second gaskets, each having an annular inner edge and a pair of opposing tabs, wherein when said butterfly valve is positioned between said first and second fittings, said first gasket is compressed in a first chamber defined by adjacent first and second gasket receiving surfaces of the butterfly valve and said first gasket receiving shelf of said first fitting, and said second gasket is compressed in a chamber defined by the other of the adjacent first and second gasket receiving surfaces of the butterfly valve and said second gasket receiving shelf of second first fitting.

13. The multiport conversion system of claim 12, wherein each of said first and second flanges have formed therein a plurality of corresponding holes and said multiport conversion fitting further comprises:

a plurality of releasable fasteners, each adapted for positioning in a pair of corresponding holes in said first and second flanges and releasably attaching said first flange of said first fitting to said second flange of said second fitting.

14. The multiport conversion system of claim 7 wherein formed in said first flange is a first annular O-ring channel, formed in said second flange is a second annular O-ring channel, and the multiport conversion system further comprises:

a first O-ring positioned in said first annular O-ring channel; and a second O-ring positioned in said second annular O-ring channel.

15. The multiport conversion system of claim 9 wherein when the butterfly valve is positioned in said multiport conversion system said first and second gaskets are substantially parallelogram-shaped in cross section.

16. The multiport conversion system of claim 10 wherein formed in said first flange is a first annular O-ring channel, formed in said second flange is a second annular O-ring channel, and the multiport conversion system further comprises:

a first O-ring positioned in said first annular O-ring channel; and a second O-ring positioned in said second annular O-ring channel.

17. The multiport conversion system of claim 12 wherein when the butterfly valve is positioned in said multiport conversion system said first and second gaskets are substantially parallelogram-shaped in cross section.

* * * * *